United States Patent [19]

Stehling et al.

[11] Patent Number: 5,382,630

[45] Date of Patent: Jan. 17, 1995

[54] LINEAR ETHYLENE INTERPOLYMER BLENDS OF INTERPOLYMERS HAVING NARROW MOLECULAR WEIGHT AND COMPOSITION DISTRIBUTION

[75] Inventors: Ferdinand C. Stehling, Baytown; Charles S. Speed, Dayton; Curtis H. Welborn, Jr., Houston, all of Tex.

[73] Assignee: Exxon Chemical Patents Inc., Linden, N.J.

[21] Appl. No.: 14,094

[22] Filed: Feb. 4, 1993

Related U.S. Application Data

[63] Continuation of Ser. No. 490,642, filed as PCT/US89/04259, Sep. 28, 1989, abandoned, which is a continuation-in-part of Ser. No. 252,094, Sep. 30, 1988, abandoned.

[51] Int. Cl.$^6$ .................. C08L 23/08; C08L 23/18; C08L 23/16
[52] U.S. Cl. .................. 525/240; 525/320; 525/322; 525/324
[58] Field of Search ........................... 525/240

[56] References Cited

U.S. PATENT DOCUMENTS

| | | | |
|---|---|---|---|
| 3,645,992 | 2/1972 | Elston | 526/348.6 |
| 4,243,619 | 1/1981 | Fraser et al. | 526/128 |
| 4,405,774 | 9/1983 | Miwa et al. | 526/348.6 |
| 4,438,238 | 3/1984 | Fukushima et al. | 525/240 |
| 4,668,752 | 5/1987 | Tominari et al. | 526/348.6 |
| 4,786,697 | 11/1988 | Cozewith et al. | 526/88 |
| 4,789,714 | 12/1988 | Cozewith et al. | 526/88 |
| 4,935,474 | 6/1990 | Ewen et al. | 526/114 |
| 4,937,299 | 6/1990 | Ewen et al. | 526/114 |
| 4,939,217 | 7/1990 | Stricklen | 526/114 |
| 5,011,891 | 4/1991 | Spenadel et al. | 525/240 |

FOREIGN PATENT DOCUMENTS

57-59943 4/1982 Japan .

*Primary Examiner*—Carman J. Seccuro, Jr.
*Attorney, Agent, or Firm*—Jaimes Sher; Myron B. Kurtzman

[57] ABSTRACT

Linear ethylene interpolymer blends are disclosed. The blends are made from components having a narrow molecular weight distribution (e.g. $M_w/M_n \leq 3$) and a narrow composition distribution (e.g. CDBI>50%). The blend components in a blend can all have the same molecular weight but different comonomer contents, the same comonomer content but different molecular weights, or comonomer contents which increase with molecular weight. The blends have either $M_w/M_n>3$ or CDBI<50%, or both, and can be multimodal with respect to either or both molecular weight and/or comonomer content. The blends are generally free of blend components having both a higher average molecular weight and a lower average comonomer content than another blend component. The blends can have improved mechanical, physical and/or chemical properties.

40 Claims, 4 Drawing Sheets

A——A PRIOR ART LLDPE
B——B CONSTANT MW, VARIABLE COMONOMER CONTENT
C——C CONSTANT COMONOMER CONTENT, VARIABLE MW
D——D INCREASING MW, INCREASING COMONOMER CONTENT
E——E INCREASING MW, INCREASING/CONSTANT COMONOMER CONTENT
F——F INCREASING/CONSTANT MW, INCREASING COMONOMER CONTENT

LINEAR ETHYLENE INTERPOLYMER BLENDS OF INTERPOLYMERS HAVING NARROW MOLECULAR WEIGHT AND COMPOSITION DISTRIBUTION

This is a continuation of application Ser. No. 490,642, filed May 25, 1990 which is the National Filing for PCT/US 89/04259 filed Sep. 28, 1989 which is a continuation in part of Ser. No. 252,094 filed Sep. 30, 1988, both U.S. applications, now abandoned.

FIELD OF THE INVENTION

The present invention relates to polymer blends of crystalline interpolymers, such as LLDPE, and more particularly to blends of such interpolymers wherein each blend component has a narrow molecular weight distribution and a narrow composition distribution selected to obtain superior properties in the blend.

BACKGROUND OF THE INVENTION

Various types of polyethylene are known in the art. Low density polyethylene ("LDPE") is generally prepared at high pressure using free radical initiators and typically has a density in the range of 0.915–0.940 g/cm$^3$. LDPE is also known as "branched" polyethylene because of the relatively large number of long chain branches extending from the main polymer backbone.

High density polyethylene ("HDPE") usually has a density in the range of greater than 0.940 to 0.960 g/cm$^3$. HDPE is prepared using a coordination catalyst, e.g. Ziegler-Natta type catalysts, at low or moderate pressures, but sometimes at high pressure. BDPE is generally linear without any substantial side chain branching. HDPE is a substantially crystalline polymer.

Linear, low density polyethylene ("LLDPE") is generally prepared in the same manner as HDPE, but incorporates a relatively minor amount of an α-olefin comonomer such as butene, hexene or octene to introduce enough short chain branches into the otherwise linear polymer to reduce the density of the resultant polymer into the range of that of LDPE. The coordination catalysts used to interpolymerize ethylene and the α-olefin generally produce an LLDPE with a relatively broad weight molecular weight distribution, i.e., Mw/Mn greater than about 3. Such LLDPE's also have relatively broad composition distribution in that the proportion of α-olefin comonomer molecules incorporated into the polymer molecules varies. Generally, the lower molecular weight polymer molecules contain a relatively higher proportion of the α-olefin comonomer than the higher molecular weight polymer molecules.

A polyethylene such as LLDPE having a broad molecular weight distribution is undesirable in many respects, depending on the desired end use application. For example, LLDPE resins known in the prior art containing relatively high molecular weight molecules are subject to orientation which results in anisotropic properties in the machine versus transverse direction of a fabrication process. On the other hand, resins containing relatively lower molecular weight molecules, in which the comonomer is invariably concentrated, tend to exhibit high block and tackiness. These lower molecular weight, highly branched molecules interfere with the proper function of certain additives compounded in the resin, increase the percentage of extractable polymer, and increase fouling in the polymerization plant. The relatively high α-olefin comonomer content of these low molecular weight polymer molecules causes such polymer molecules to be generally amorphous and to exude to the surface of fabricated parts, thereby producing an undesirable sticky surface.

Prior art polyethylenes such as LLDPE also generally tend to have a very broad, nonuniform distribution of comonomer content, i.e. some polymer molecules have a relatively high α-olefin comonomer content while others have a relatively low content. Generally, the polymer molecules of low comonomer content are relatively more crystalline and have a high melting temperature, whereas the high comonomer content polymer molecules are more amorphous and melt at a lower temperature. The presence of a higher melting component is disadvantageous in many applications, for example where softness or clarity is desired. On the other hand, the presence of a lower melting component frequently results in a high quantity of extractables, which limit food contact applications.

Prior art blends of polyethylenes designed to improve one or more of the properties of the blend relative to its blend components or prior art polyethylene have also suffered from the drawbacks mentioned above. For example, incorporating a blend component with a high average comonomer content to reduce crystallizability generally results in an increase of extractables and adversely affects other properties so that the full advantage of the blend is not realized. Thus, there is a need to provide ethylene interpolymer blends with superior properties and in which the full advantages of blending may be realized.

SUMMARY OF THE INVENTION

The present invention provides a blend of ethylene interpolymer components with narrow molecular weight and composition distributions selected to obtain an overall molecular weight and composition distribution in the resulting blend to impart superior properties thereto. Broadly, the blends of this invention comprise a plurality of linear ethylene interpolymer components wherein each component has a $M_w/M_n$ value less than or equal to 3 and a composition distribution breadth index (as later described) of 50% or higher. The blend is substantially free of blend components having both a higher average molecular weight and a lower average comonomer content than that of any other polyethylene component in the blend. The components for the blend can be selected so that the resultant blend has plural modality with respect to molecular weight distribution, comonomer content, or both.

In another aspect, the components for the blend are linear ethylene interpolymers having the narrow molecular weight and composition distributions mentioned above and the blend components are selected from one of the groups consisting of: (1) linear ethylene interpolymer blend components having substantially the same average molecular weight but different average comonomer contents; (2) linear ethylene interpolymer blend components having substantially the same average comonomer content but different average molecular weights; and (3) linear ethylene interpolymer blend components having different average molecular weights and comonomer contents in which the blend components, taken serially in order of increasing average molecular weight, have an increasing comonomer content.

In still another aspect, the linear ethylene interpolymer blend components have the narrow molecular weight and composition distribution mentioned above, and for the linear ethylene interpolymer blend components taken serially in order of increasing average molecular weight, then each succeeding component has substantially the same or a higher average comonomer content than each preceding component in said series.

In another aspect, the invention provides a linear ethylene interpolymer having plural modality with respect to comonomer content, a narrow molecular weight distribution such that $M_w/M_n \leq 3$ and an overall composition distribution breadth index less than 50%.

In still another aspect, the invention provides a linear ethylene interpolymer having plural modality with respect to molecular weight so that the blend has broad overall molecular weight distribution such that $M_w/M_n > 3$ and a composition distribution breadth index greater than or equal to 50%.

In still another aspect, the invention provides a linear ethylene interpolymer of plural modality with respect to both comonomer content and molecular weight, comprising a plurality of components having a narrow molecular weight distribution such that $M_w/M_n \leq 3$ for each fraction and each component taken serially in order of increasing average molecular weight, has an increasing average comonomer content.

In a still further aspect of the invention, there is provided a linear ethylene interpolymer blend of plural modality with respect to both comonomer content and molecular weight which comprises a plurality of components having a composition distribution breadth index of 50% or more, wherein the components taken serially in order of increasing comonomer content, have an increasing average molecular weight.

DESCRIPTION OF THE PREFERRED EMBODIMENTS

The linear ethylene interpolymer blend components in the present invention are higher interpolymers of a major proportion of ethylene and a minor proportion of comonomer. The ethylene is generally polymerized in a proportion of 70–100, typically 70–97, and often 70–80, 80–90 or 90–95, mole percent of the interpolymerized monomers with 0–30, typically 3–30, and often 20–30, 10–20 or 5–10, mole percent comonomer. Contemplated blend components generally include elastomer blend components in the density range of about 0.85–0.900 g/cm$^3$, very low density polyethylene blend components in the density range of about 0.900–0.915 g/cm$^3$, and linear, low density polyethylene blend components in the density range of about 0.915–0.940 g/cm$^3$. Ethylene interpolymers having a density in the high density polyethylene range above about 0.940 g/cm$^3$ are also contemplated as being suitably employed in the invention.

Suitable comonomers interpolymerized with the ethylene to obtain the ethylene interpolymer blend components herein generally include monomers which may be copolymerized with ethylene to obtain the molecular weight distribution and comonomer distribution desired in the blend component. A preferred class of comonomers are the α-olefins having 3 to about 12 carbon atoms, such as propylene, 1-butene, 1-pentene, 1-hexene, 3-methyl-1-pentene, 4-methyl-1-pentene, 1-octene, 1-decene, 1-dodecane and the like. Other suitable comonomers include vinyl cyclohexane, norbornene, vinyl cyclohexene, and other diene comonomers such as 1,3-butadienne, 1,4-hexadiene, 4-methyl-1,4-hexadiene, 5-methyl-1,4-hexadiene, 1,5-hexadiene and the like. The ethylene interpolymer may include one or more of such comonomers, i.e. it may be a copolymer, terpolymer, etc.

The molecular weight of the LLDPE blend components may range from one thousand to one million or more depending on the particular end use, preferably $10^4$–$10^6$, and especially $2 \times 10^4$–$5 \times 10^5$. As used herein, the terms "average molecular weight" and "molecular weight" refer to weight average molecular weight unless otherwise indicated. The linear polyethylene blend components preferably have a narrow molecular weight distribution (MWD). By "narrow MWD" is meant that the ratio of the weight average molecular weight ($M_w$) to the number average molecular weight ($M_n$) is less than or equal to 3.0. Particularly preferred are the linear polyethylene blend components having a very narrow MWD, i.e. $M_w/M_n$ less than or equal to 2.5, and especially less than or equal to 2.0. Molecular weight distributions of ethylene interpolymers are readily determined by techniques known in the art, such as, for example, size exclusion chromatography.

The linear polyethylene blend components preferably have a composition distribution (CD) such that the composition distribution breadth index (CDBI) is at least 50%. The CDBI is defined as the weight percent of the copolymer molecules having a comonomer content within 50 percent of the median total molar comonomer content. The CDBI of linear polyethylene, which does not contain a comonomer, is defined to be 100%. The CDBI of a copolymer is readily calculated from data obtained from techniques known in the art, such as, for example, temperature rising elution fractionation as described, for example, in U.S. patent application Ser. No. 151,350 or in Wild et al., *J. Poly. Sci, Poly. Phys. Ed.*, vol. 20, p. 441 (1982). Unless otherwise indicated, terms such as "comonomer content", "average comonomer content" and the like refer to the bulk comonomer content of the indicated interpolymer blend, blend component or fraction on a molar basis.

Figure 2:
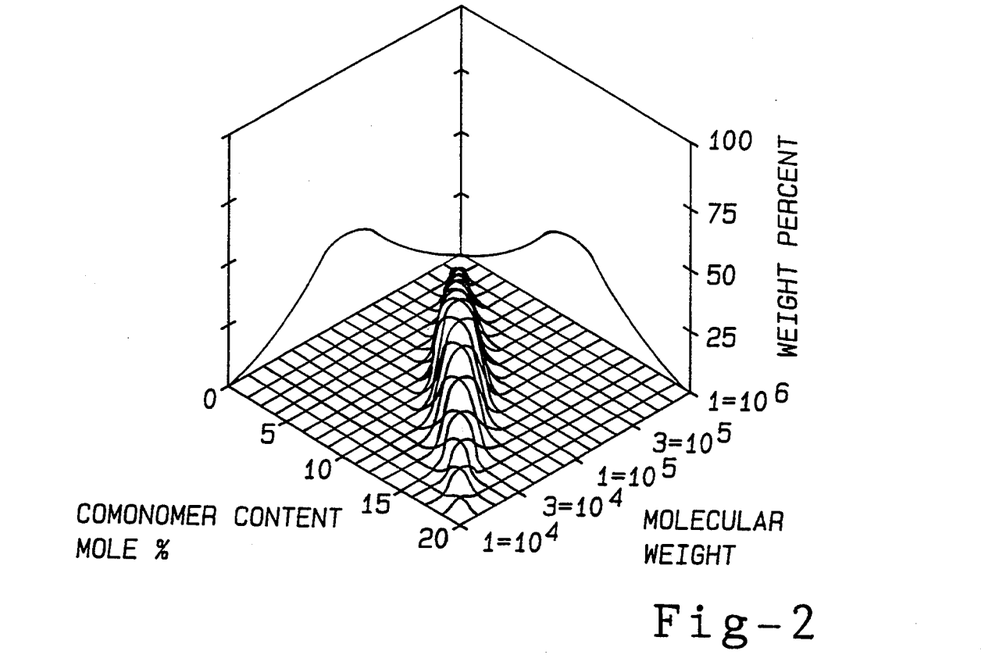
FIG. 2 illustrates the broad molecular weight distribution and broad composition distribution of a typical prior art LLDPE.
Figure 3:
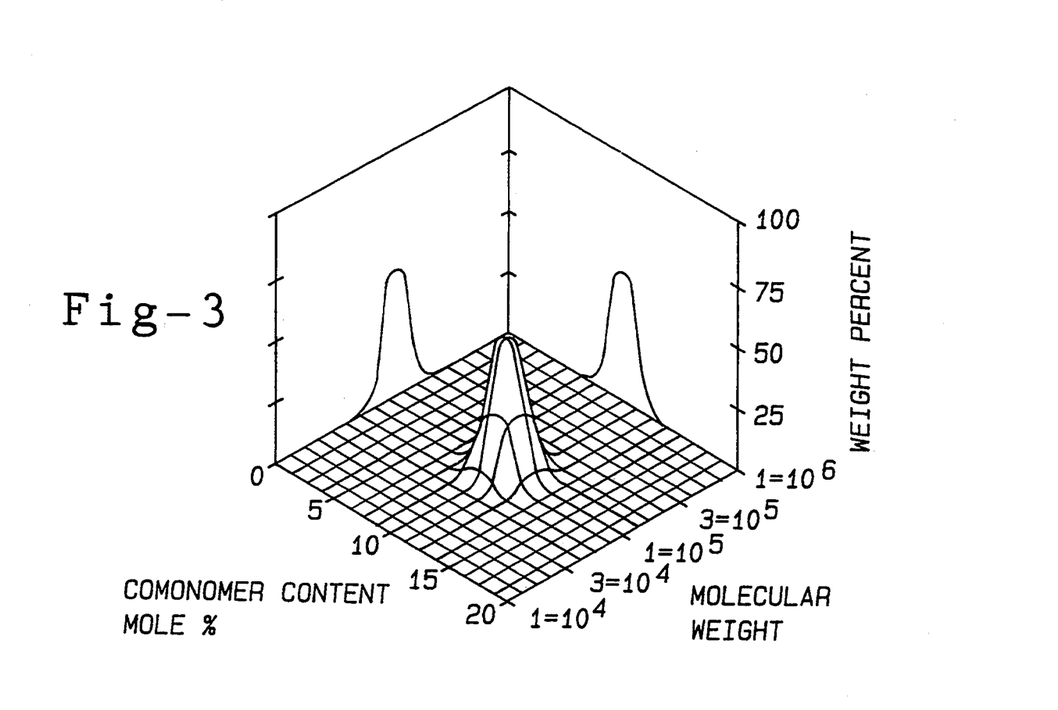
FIG. 3 illustrates the narrow molecular weight distribution and narrow composition distribution of an exemplary blend component used in the present invention.

A graphical illustration of an exemplary narrow MWD, narrow CD blend component is seen in FIG. 3. In this three-dimensional figure, the Y-axis is the molecular weight, the X-axis is the molar comonomer content, and the Z-axis represents the incidence or weight proportion of molecules. As can be seen, the MWD and the CD of the blend component are narrow and appear as relatively sharp peaks in FIG. 3. In contrast, the MWD/CD diagram for a typical conventional LLDPE seen in FIG. 2 shows a broad MWD and a broad CD, and the comonomer content tends to decrease as the molecular weight increases.

In the blends of the present invention, one or more of the properties of the blend are improved by appropriate selection of narrow MWD, narrow CD blend components. In one embodiment, for example, tear strength may be controlled by blending linear polyethylene resins having about the same average molecular weight but with different average comonomer contents. Such a blend is illustrated as line B in FIG. 1. In another embodiment, the comonomer contents of the linear polyethylene blend components are the same, but molecular weights are varied, as illustrated by line C in FIG. 1. In still further embodiments illustrated by lines D, E and F in FIG. 1, the blend components taken serially in order of increasing molecular weight, or in order of increasing molar comonomer content, have the same or higher comonomer content or molecular weight, respectively.

As used herein, two or more blend components have substantially the same molecular weight if the resulting MWD of the blend thereof is similarly narrow to the MWD of each blend component, i.e. the value of $M_w/M_n$ of the resulting blend is less than or equal to about 3.0, preferably less than about 2.5. Conversely, two or more blend components have a different average molecular weight if the overall $M_w/M_n$ of the resulting blend is relatively greater than for each such blend component, i.e., the $M_w/M_n$ of the blend is greater than 3.0. As used herein, two or more blend components have a different comonomer content if the overall CDBI of the resulting blend is relatively less than that of each such blend component, i.e., the overall CDBI of the blend is less than 50%. Conversely, two or more blend components have substantially the same molar comonomer content if the resulting CD of the blend thereof is similarly narrow with respect to each blend component, i.e., the resulting blend has a CDBI of 50% or greater. It is readily appreciated that the CD and MWD of a blend can depend on the relative proportions of each blend component employed therein. It is specifically contemplated that blend components may have the "same" molecular weight for purposes of one blend, but not for the purpose of another blend, e.g. wherein the components would result in the blend having an MWD less than or greater than 3.0 depending on the proportion of each blend component. Similarly, blend components may have a "different" comonomer content for purposes of one blend, but not for the purposes of another blend, e.g. wherein the components would result in the final blend having CDBI less than or greater than 50% depending on the proportion of each blend component.

Figure 4:
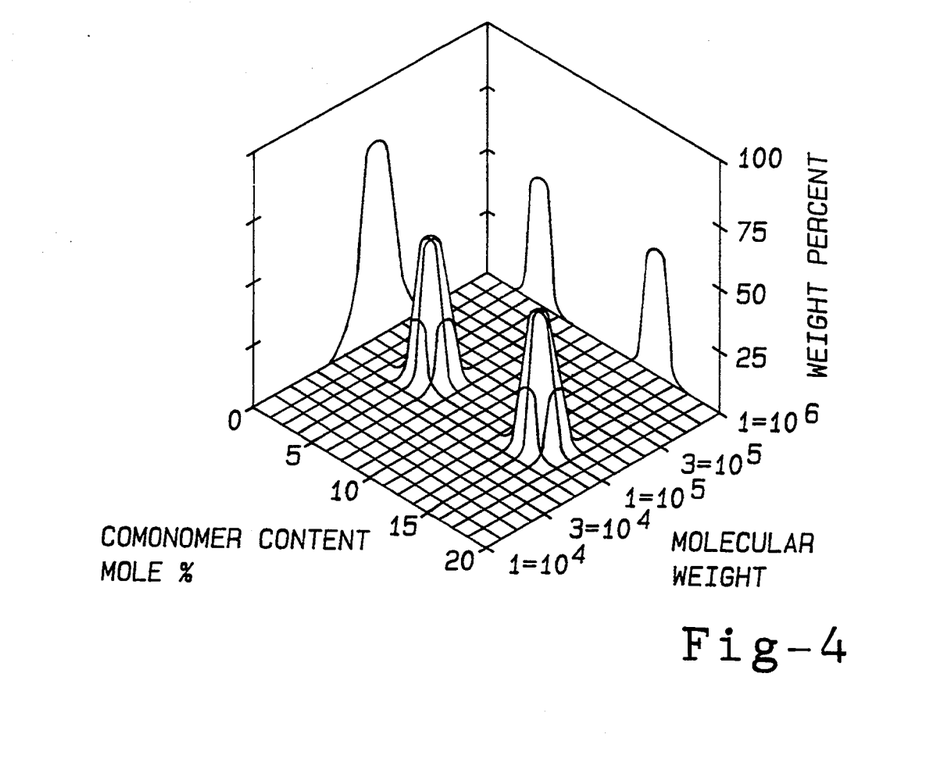
FIG. 4 illustrates the molecular weight distribution and composition distribution of an exemplary LLDPE blend according to an embodiment of the invention in which the blend components have about the same molecular weight but differing comonomer contents.

The molecular weight and composition distribution of a bimodal blend of the invention is illustrated graphically in FIG. 4. It is seen from this MWD/CD diagram that the comonomer content of each of the blend components is different, while the molecular weight of each blend component is about the same. This blend corresponds to line B of FIG. 1. In contrast, a similar graph for typical conventional LLDPE is seen in FIG. 2, and line A of FIG. 1, and shows that the lower molecular weight fractions contain more of the comonomer than the higher molecular weight fractions. The lower molecular weight molecules which contain relatively high comonomer concentrations as in this conventional LLDPE can cause undesirable effects such as poor surface properties, high block and tackiness, cling development, high levels of extractables, and fouling of polymerization plants. In the present invention, such effects are minimized and properties are enhanced by providing blends of the type illustrated in Curve B, C, D, E, and F.

As an example of the embodiment of Curve B, it has been found that a 50—50 blend of a first LLDPE having a 6.4 mole % 1-butene content and a $M_w$ of 80,400 ($M_w/M_n=2.3$; CDBI=~67%; MI 4.0 dg/min; density 0.9042 g/cm$^3$) with a HDPE having a 0.0 mole % 1-butene content and a $M_w$ of 76,700 ($M_w/M_n=2.8$; CDBI=~100%; MI 5.0 dg/min; density 0.9552 g/cm$^3$) has an Elmendorf tear strength of 210 g/mil, synergistically enhanced in contrast to the tear strengths of 111 and 48 g/mil for the respective first and second blend components. Further, a 25-75 blend of these same components has a further enhanced Elmendorf tear strength of 227 g/mil. This result is quite surprising and unexpected because including a higher proportion of the second LLDPE resin with the lower tear strength in the blend increases the tear strength of the resulting blend, rather than decreasing the tear strength as would be expected.

Figure 1:
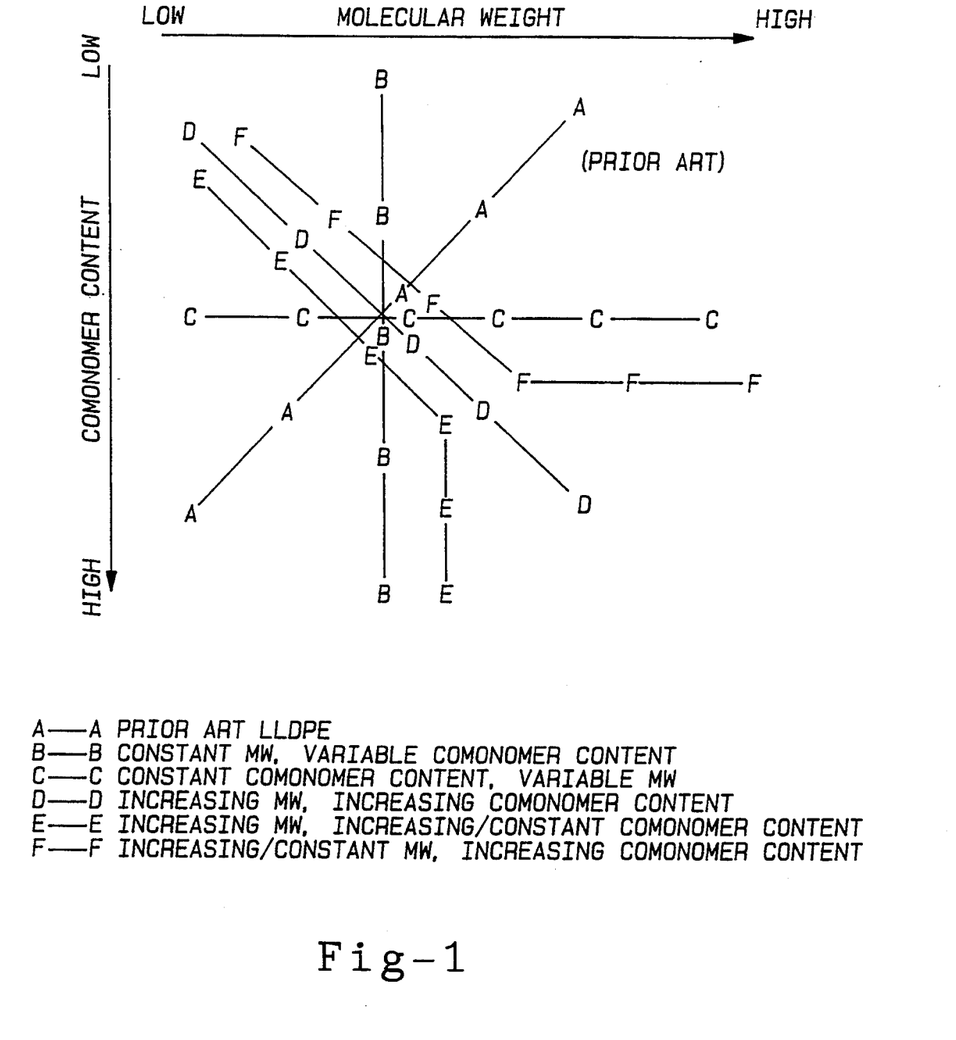
FIG. 1 is a schematic illustration of different blends made from poly(ethylene-co-α-olefin) blend components having narrow molecular weight and composition distributions.
Figure 5:
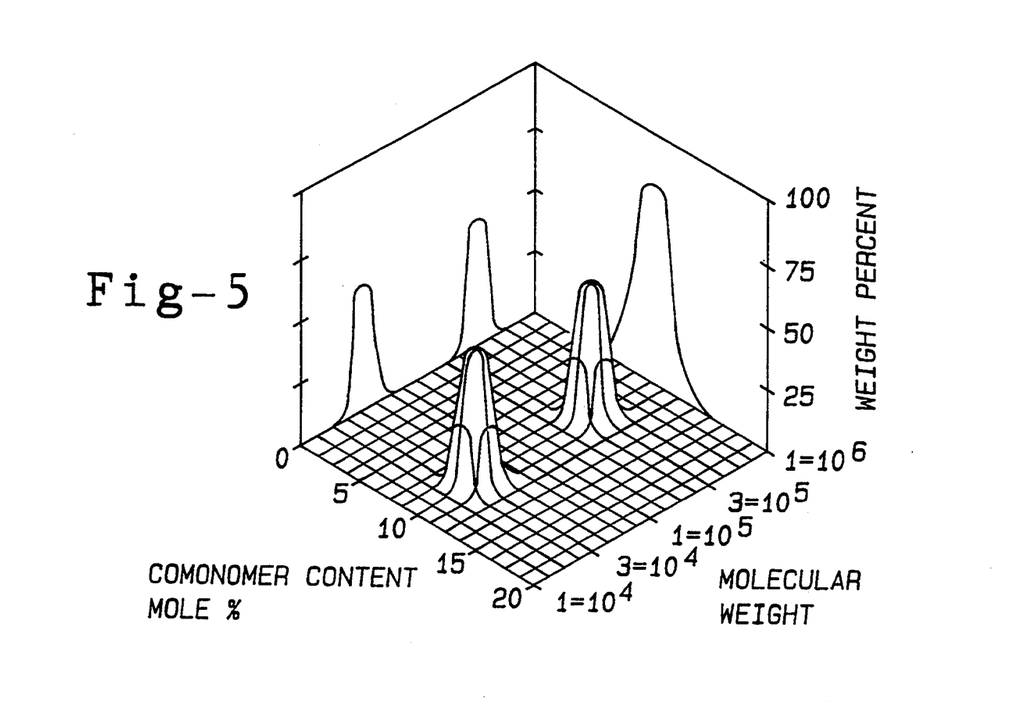
FIG. 5 illustrates the molecular weight distribution and composition distribution of an exemplary LLDPE blend according to another embodiment of the invention in which the blend components have about the same comonomer content but differing molecular weights.
Figure 6:
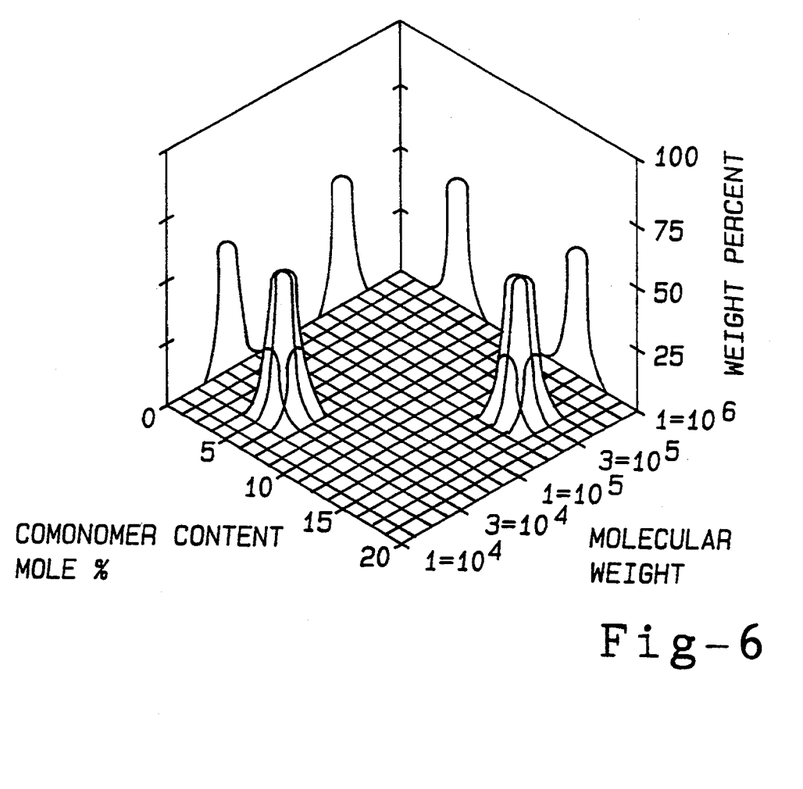
FIG. 6 illustrates the molecular weight distribution and composition distribution of an exemplary LLDPE blend according to yet another embodiment of the invention in which the conomoner contents of the blend components increases as the molecular weight increases.

In another embodiment exemplified in FIG. 5 and line C of FIG. 1, a multimodal MWD is obtained by blending linear polyethylene components having narrow molecular weight and composition distributions, and about the same comonomer content, but differing molecular weights. The molecular weight distribution of such blends improves the melt processability and theological characteristics thereof, for example, high extrusion rates, high bubble stability, high shear sensitivity, reduced draw resonance. On the other hand, the optical properties of mechanical, surface and individual blend components are generally substantially retained or improved in the blend thereof, including, for example tear strength, modulus, yield strength, reduced blocking, clarity, gloss, haze and the like. Moreover, such blends have lower portions of soluble molecules than prior art copolymers having similar molecular weight distribution. Desirable molecular weight and composition distributions may be obtained by blending different components, or by polymerization of the blend components simultaneously in the same reactor or in multiple reactors.

The higher molecular weight fraction containing relatively less comonomer as in conventional LLDPE may cause an anisotropic morphology during fabrication processing known as "row nucleated" or "shish-kabob" morphology. This anisotropic morphology is believed to contribute to poor toughness in articles crystallized from flowing melts. In the present invention, the anisotropy may be minimized by providing a blend with lower concentrations of such higher molecular weight molecules with a relatively low comonomer content and by incorporating the comonomer in the blend components as indicated in blend B, C, D, E and F.

In another embodiment as exemplified by FIG. 5 and line D of FIG. 1, the blend includes components having narrow molecular weight and composition distributions, but differing average molecular weights and average comonomer contents. However, in contrast to conventional LLDPE as illustrated in line A of FIG. 1 and in FIG. 2, the blend of this embodiment has a greater comonomer content in the higher molecular weight fractions or blend components than in the lower molecular weight fractions or blend components. These distributions are obtained, for example, by blending narrow MWD, narrow CD linear polyethylene resins which, taken serially in order of increasing molecular weight, have an increasing comonomer content. It is also contemplated that the blend may include two or more blend components having the same molecular weight as illustrated by line F in FIG. 1, in which case such components would be included in the serial ordering secondarily in order of their increasing average comonomer content. Also, the presence of two or more blend components having the same comonomer content is also contemplated as being within the purview of this embodiment, as illustrated by line E in FIG. 1, provided that there is included either at least one blend component having a higher comonomer content and molecular weight or at least one blend component having a lower comonomer content and lower molecular weight than any of the blend components having the same comonomer content. In this embodiment, the blend is preferably substantially free of blend components having both a higher molecular weight and a lower comonomer content than any component present in the blend.

Such a blend has properties which are significantly different from prior art blends and conventional LLDPE resins in which the comonomer content generally decreases in proportion to increasing molecular weight components or fractions. The isotropy and toughness of films made from such blends are improved by minimizing the anisotropic shish-ka-bob or row-nucleated morphology ordinarily caused by a low concentration of comonomers present in the higher molecular weight molecules in conventional LLDPE resins. Moreover, such blends have desirable properties such as, for example, reduced blocking, reduced coefficients of friction, and lower extractables, in comparison to conventional LLDPE resins.

The linear polyethylene blend components of the invention may be prepared by use of catalyst systems of the metallocene type known to provide narrow CD/MWD resins. Cyclopentadienylide catalyst systems using a metallocene complex in conjunction with an alumoxane cocatalyst or reaction product thereof are suitable for preparing the polymer components utilized in the blends of the invention. The metallocene catalyst may be represented by the general formula $(C_p)_m MR_n R'_p$ wherein $C_p$ is a substituted or unsubstituted cyclopentadienyl ring; M is a Group IVB, or VB transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. Various forms of the catalyst system of the metallocene type may be used for polymerization to prepare the polymer components of the present invention including those of the homogenous or the heterogeneous, supported catalyst type wherein the catalyst and alumoxane cocatalyst are together supported or reacted together onto an inert support for polymerization by gas-phase, high pressure, slurry, or solution polymerization.

The cyclopentadienyls of the catalyst may be unsubstituted or substituted with hydrogen or hydrocarbyl radicals. The hydrocarbyl radicals may include alkyl, alkenyl, aryl, alkylaryl, arylalkyl, and like radicals containing from about 1–20 carbon atoms or where 2 carbon atoms of cyclopentadienyl are joined together to form a $C_4$–$C_6$ ring. Exemplary hydrocarbyl radicals include methyl, ethyl, propyl, butyl, amyl, isoamyl, hexyl, isobutyl, heptyl, octyl, nonyl, decyl, cetyl, 2-ethylhexyl, phenyl and the like. Exemplary halogen substituents include chlorine, bromine, flourine and iodine. Of these halogen atoms, chlorine is preferred. Exemplary hydrocarboxy radicals are methoxy, ethoxy, propoxy, butoxy, amyloxy and the like. Illustrative, but non-limiting examples of the metallocene catalyst useful in preparing the polymers of the present invention include bis(cyclopentadienyl)titanium dimethyl, bis(cyclopentadienyl) titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide, bis(cyclopentadienyl)zirconium ethyl iodide, bis(cyclopentadienyl)zirconium phenyl bromide, bis(cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Other metallocenes which may be usefully employed to prepare the polymer components of the invention include the monocyclopentadienyls titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=$CH_2$ and derivatives of this reagent such as bis(cyclopentadienyl)Ti=$CH_2 \cdot Al(CH_3)_3$, $(Cp_2TiCH_2)_2$, $Cp_2TiCH_2CH(CH_3)CH_2$, $Cp_2Ti$—$CHCH_2CH_2$; substituted bis(cyclopentadienyl)titanium (IV) compounds such as: bis(indenyl)titanium diphenyl or dichloride, bis(methylcyclopentadienyl)titanium diphenyl or dihalides; dialkyl, trialkyl, tetraalkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes and the like.

Additional zirconocene catalysts useful according to the present invention include bis(cyclopentadienyl) zirconium dimethyl; bis(cyclopentadienyl) zirconium dichloride, bis(cyclopentadienyl) zirconium methylchloride, pentamethylcyclopentadienyl zirconium trichloride, pentaethylcyclopentadienyl zirconium trichloride, bis(pentamethylcyclopentadienyl)zirconium diphenyl, the alkyl substituted cyclopentadienes, such as bis(ethylcyclopentadienyl)zirconium dimethyl, bis($\beta$-phenylpropylcyclopentadienyl)zirconium dimethyl, bis(methylcyclopentadienyl)zirconium dimethyl, bis(n-butyl-cyclopentadienyl)zirconium dimethyl, bis(cyclohexylmethylcyclopentadienyl)zirconium dimethyl, bis(n-octyl-cyclopentadienyl)zirconium dimethyl, and haloalkyl and dihalide complexes of the above; di-alkyl, trialkyl, tetra-alkyl, and penta-alkyl cyclopentadienes, such as bis(pentamethylcyclopentadienyl)zirconium di-methyl, bis(1,2-dimethylcyclopentadienyl)zirconium dimethyl and dihalide complexes of the above; silicon, phosphorus, and carbon bridged cyclopentadiene complexes such as dimethylsilyldicyclopentadienyl zirconium dimethyl or dihalide, and methylene dicyclopentadienyl zirconium dimethyl or dihalide, and methylene dicyclopentadienyl ethylene bridged bis(tetrahydroindenyl) zirconium dimethyl or dihalide, carbenes represented by the formula $Cp_2Zr=CHP(C_6H_5)_2CH_3$, and derivatives of these compounds such as $Cp_2ZrCH_2CH(CH_3)CH_2$.

Bis(cyclopentadienyl)hafnium dichloride, bis(cyclopentadienyl)vanadium dichloride and the like are illustrative of other metallocenes.

The alumoxanes are polymeric aluminum compounds which can be represented by the general formulae $(R-Al-O)_n$ which is a cyclic compound and $R(R-Al-O-)_nAlR_2$, which is a linear compound. In the general formula R is a $C_1$–$C_5$ alkyl group such as, for example, methyl, ethyl, propyl, butyl and pentyl and n is an integer from 2 to about 20. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for example, aluminum trimethyl, in a suitable organic solvent such as benzene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate.

Preferably, the alumoxane is prepared in the presence of a hydrated ferrous sulfate as described in U.S. Pat. No. 4,665,208. The method comprises treating a dilute solution of aluminum trimethyl in, for example, toluene with ferrous sulfate represented by the general formula $FeSO_4 \cdot 7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The ratio of aluminum in the alumoxane to total metal in the metallocenes can be in the range of about 0.5:1 to about 10,000:1, and preferably about 5:1 to about 1000:1.

Various inorganic oxide supports may be used for supported catalyst systems to prepare interpolymers and blend components of the present invention. The polymerization is generally carried out in the temperature range of about 0°–160° C., or even higher, but this range is not meant to be exclusive for preparing the interpolymer and blend components of the invention, which may be prepared by any technique resulting in the structure set forth. Atmospheric, sub-atmospheric, or super-atmospheric pressure conditions have been used for the polymerization using the metallocene catalyst described above. It is generally preferred to use catalyst compositions at a concentration so as to provide from about 1 ppm to about 5000 ppm, most preferably 10 ppm to 300 ppm, by weight of transition metal based on the weight of monomers in the polymerization of the ethylene polymers.

A slurry polymerization process generally uses super-atmospheric pressures and temperatures in the range of 40°–110° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Preferably, hexane or toluene is employed.

In a modification, the polymer components of the present invention may be formed by gas-phase polymerization. A gas-phase process utilizes super-atmospheric pressure and temperatures in the range of about 50°–120° C. Gas-phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50°–120° C. Triethylaluminum may be added as needed as a scavenger of water, oxygen, and other adventitious impurities. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal. The polymer obtained can be extruded into water and cut into pellets or other suitable comminuted shapes. Pigments, antioxidants and other additives may be added to the polymer, as is known in the art.

The blends of the present invention are prepared by blending the desired components in the desired proportions using conventional blending, techniques and apparatus, such as, for example, screw-type extruders, Banbury mixers, and the like. Alternatively, the blends may be made by direct polymerization, without isolation of the blend components, using, for example, two or more catalysts in one reactor, or by using a single catalyst and two or more reactors in series or parallel. The blend may also be compounded with various conventional additives known in the art such as, for example, antioxidants, UV stabilizers, pigments, fillers, slip additives, block additives, and the like. The blend preferably does not contain any blend components in proportions which would significantly adversely affect any improved properties desired to be obtained by blending the LLDPE resins.

The invention is illustrated by way of the following examples:

EXAMPLE 1

An ethylene homopolymer resin, identified as '006, having characteristics shown in Table 1, was prepared in a gas phase reactor employing a silica supported transition metal catalyst described below.

The gas phase reaction was carried out at 185° F. reaction temperature, 195 psi ethylene pressure, a hydrogen/ethylene mole ratio of 0.00041, and a residence time of 2 hours. A second polymer, an ethylene/butene-1 copolymer identified as '013, having characteristics shown in Table 1 was prepared in the gas phase reactor using the same supported catalyst as described below. The gas phase reaction was carried out at 140° F. reactor temperature, 195 psi ethylene pressure, a hydrogen/ethylene mole ratio of 0.00061, a butene-1/ethylene mole ratio of 0.123, and a residence time of 2 hours.

The silica supported transition metal catalyst was obtained as follows:

100 grams of high surface area (Davison 952) silica, dehydrated in a flow of dry nitrogen at 800° C. for 5 hours, was slurried with 500 cc of toluene at 25° C. under nitrogen in a 2500 cc round-bottom flask using a magnetic stirrer. 250 cc of methyl alumoxane in toluene (1.03 mole/liter in aluminum) was added dropwise over 15 minutes with constant stirring to the silica slurry. Stirring was continued for 30 minutes while maintaining the temperature at 25° C. To the alumoxane treated silica slurry was added dropwise over 15 minutes, with constant stirring 250.0 cc of toluene solution containing 2.00 grams of bis(n-butylcyclopentadienyl)zirconium dichloride. This slurry was stirred an additional one half hour while maintaining the temperature at 65° C. and thereafter the toluene was decanted and the solids recovered and dried in vacuo for 4 hours. Analysis of the catalyst indicated that it contained 4.5 wt % aluminum and 0.63 wt % zirconium.

Resins '006 and '013 were then intensively mixed at 360° F. in equal proportions in a Banbury melt blender along with 1000 ppm each of the stabilizers Irganox 1076 and Irgafos 168. The molten blend from the Banbury was transferred to a roll mill, made into a thin sheet and then cooled to room temperature. The cold sheet was then chopped into approximately ⅛ inch chips. Characteristics of this blend, identified as Blend B1, are given in Table 1.

Compression molded sheets, five thousandth of an inch in thickness, were prepared by melting the chopped blend at 160° C. in a press, compressing to 20 tons pressure for 5 minutes and then cooling the blend under pressure to room temperature at a rate of 15° C. per minute. Properties of the molded sheet specimen are shown in Table 2.

EXAMPLE 2

A second compression molded sheet was prepared and tested as in Example 1, from the resins described in Example 1, except that the blend which is identified as Blend B2, consisted of one part '006 and three parts '013. Characteristics of Blend B2 are given in Table 1, properties of Blend B2 are given in Table 2.

TABLE I

POLYMER CHARACTERIZATION

| Sample Designation | Mole % Butene[a] | Mw[b] | Mw/Mn[b] | Density[c] | Melt Index[d] | CDBI[e] |
|---|---|---|---|---|---|---|
| '006 | 0.0% | 76,700 | 2.8 | 0.9552 | 5.0 | 100% |
| '013 | 6.4 | 80,400 | 2.3 | 0.9042 | 4.0 | 67% |
| Blend B1 | 2.7 | 76,500 | 2.4 | 0.9335 | 4.4 | 25% |
| Blend B2 | 4.9 | 76,900 | 2.3 | 0.9172 | 4.3 | 44% |

[a] By C-13 NMR
[b] Weight average molecular weight (Mw), and ratio of number average molecular weight (Mn), Mw/Mn by size exclusion chromatography.
[c] Density by gradient column method, ASTM D1585, g/cm³
[d] Melt index by ASTM D1738 Condition E, dg/min
[e] CDBI, composition distribution breadth index, is defined as the weight percent of polymer molecules having a comonomer content within 50% of the median total molar comonomer content CDBI; of HDPE is defined to be 100%. Determined using temperature rising elution fractionation using tetra-chloroethylene solvent over a 6° C. to 120° C. temperature range as described in U.S. Pat. Appl. Ser. No. 151,350.
See also Wild, et al, J. Poly. Sci. Ed, Vol. 20, p 441 (1982).

TABLE 2

TEAR AND TENSILE STRENGTH OF MOLDED SHEET

| Sample Designation | Tear Strength[e] | Tensile Strength[f] @ Yield | Tensile Strength[f] @ Break | Elongation[f] @ Yield | Elongation[f] @ Break | Modulus[f] Secant | Modulus[f] Tangent |
|---|---|---|---|---|---|---|---|
| '006 | 48 | 3640 psi | 840 | 18% | 710% | 127,000 | 155,000 |
| '013 | 111 | 800 | 3230 | 70 | 1830 | 165,000 | — |
| Blend B1 | 210 | 1900 | 2870 | 23 | 1620 | 70,600 | 76,000 |
| Blend B2 | 227 | 1330 | 3030 | 28 | 1530 | 37,700 | 42,000 |

[e] Tear strength, in g/mil, measured using ASTM 1922, tear resistance by pendulum method
[f] Tensile strength, elongation, and modulus measured using ASTM D638

EXAMPLE 3

Polymers used as blend components were synthesized by a procedure similar to that described below for Run 03. A stainless steel, 1-liter Zipperclave autoclave reactor was used in the syntheses. The reactor was equipped with a water jacket for heating and cooling, a septum inlet for injection of liquid components, a burette for measuring and adding purified hexane, and a controlled pressure source of purified ethylene and nitrogen. Polymerization reactions were started by cleaning the reactor and purging it with purified nitrogen for several hours. 800 cc of purified hexane was added to the reactor vessel at 25° C. by means of the measuring burette. 100 cc of purified 1-hexene was then added under nitrogen, and the contents of the reactor were continuously stirred at 1200 rpm henceforth. 10.0 cc of the 10 wt % solution of methylalumnoxane was added by syringe, and the reactor temperature was equilibrated at the reaction temperature of 60° C. Hydrogen was not used in this example it is added at this time in the examples which do use it. Hydrogen was metered into the reactor from a vessel of known volume equipped with a highly precise pressure gauge. The ideal gas law was used to calculate the millimoles of hydrogen introduced into the reactor. 1.00 cc of a solution of 0.01 wt % bis(n-butylcyclopentadienyl) zirconium dichloride in distilled toluene was then injected by syringe, followed by pressurization immediately with 90.9 psi of purified ethylene. Ethylene was fed continuously on demand to the stirring reactor while maintaining the reaction temperature at 60° C. and the reaction pressure at 90 psi. After 10 minutes of polymerization the reaction was stopped by rapidly cooling and venting the pressure and exposing the contents to air. The polymer was obtained by evaporating the liquid components and drying in a vacuum oven for 1 hour. The poly(ethylene-co-hexene-1) polymer obtained, which is identified as C03, was obtained in 89.7 yield.

Other polymerizations runs were performed using the procedure above with the exception that the volumes, temperatures, and other polymerization conditions were modified as shown in Table 3. Characterization data for the blend components are given in Table 4.

Blends 8A, 9D, 20C, 21F and 22E were each prepared using equal quantities of three blend components. (The letter designation in these blends corresponds to the type of blend illustrated in FIG. 1.) Blend components for each of the blends are given in Table 4, and they were blended by the following solution blending procedure using ca. 14 g. of each blend component. 2000 cc of xylene was purged with nitrogen for one hour, the three blend components were added, and the mixture was stirred and heated to 144° C. to dissolve the polymers. The polymer solution was then cooled to 70° C., and 2000 cc of methanol was added to precipitate the polymer. The mixture was then cooled to 22° C., and the precipitated polymer was filtered and dried in a vacuum oven. Average composition, composition distribution breadth index, molecular weight data, and density of the blends are listed in Table 4.

Compression molded sheets, five thousandth of an inch in thickness, were prepared by melting the blended polymers in a press, compressing to 20 tons pressure for 5 minutes and then cooling the blend under pressure to room temperature. Properties of the molded sheet specimen are shown in Table 5 for blends 8A, 9D, 20C, 21F and 22E. The fraction of polymer extracted by hexane at 69° C. is also given for the blends.

Table 5 shows that the tear strength of blends 9D, 20C, 21F and 22E, i.e., blends having novel composition-molecular weight distributions, are each superior to that of blend 8A, which has a conventional-type composition-molecular weight distribution. In many applications it is desirable to have low levels of extractable polymer, and the table shows that blends 9D, 20C, 21F, and 22E are markedly superior to blend 8A in this respect. Moreover, tensile properties such as tensile strength at yield of the conventional-type blend 8A are generally comparable to the tensile strengths of the other blends. Consequently, the benefits of high tear strength and low levels of extractables can be achieved without undue loss of tensile properties.

This example illustrates the benefits obtained by certain novel composition-molecular weight distributions differing from the conventional type. Thus, blends 9D and 20C have similar average molecular weights and molecular weight distributions. Consequently, flow and melt fabrication performance of these blends should be similar to that of the conventional-type blend 8A. Therefore, the desirable mechanical and solubility properties of blends 9D and 20C are not obtained at the expense of fabrication performance. Additionally, blends 21F and 22E have much lower weight average molecular weight than blend 8A, and they should therefore be more easily fabricated into articles of commerce such as films, fibers and molded objects.

In summary, in the blends of this example (Type C, D, E and F blends) the average molecular weight and molecular weight distribution can be manipulated independently of the composition distribution. Superior solid state performance can therefore be achieved without sacrificing melt fabrication performance.

TABLE 3

| Polymerization Run No. | Reaction Temp. °C. | $C_2^=$ Press. (psi) | Time (min.) | Hexane (cc) | 1-Hexene (cc) | Catalyst Solu. (cc) | Yield gm | $H_2$ m mole |
|---|---|---|---|---|---|---|---|---|
| 03 | 60 | 90 | 10 | 800 | 100 | 1.0 | 89.7 | — |
| 09 | 80 | 60 | 10 | 800 | 75 | 1.0 | 36.6 | — |
| 15 | 80 | 60 | 15 | 800 | — | 1.0 | 47.0 | 10 |
| 19 | 80 | 60 | 60 | 800 | 75 | 0.25 | 44.2 | 5 |
| 27 | 90 | 60 | 45 | 800 | 150 | 0.50 | 96.5 | — |
| 30 | 75 | 75 | 42 | 800 | 87.5 | 0.55 | 86.3 | — |
| 38 | 60 | 130 | 20 | 800 | 150 | 0.20 | 89.5 | — |
| 42 | 60 | 60 | 30 | 800 | — | 1.0 | 81.0 | — |
| 48 | 70 | 170 | 9 | 300 | 600 | 0.5 | 114.0 | — |
| 64 | 68 | 302 | 60 | — | 800 | 0.05 | 53.0 | — |

TABLE 4

POLYMER CHARACTERIZATION OF BLENDS AND BLEND COMPONENTS

| Sample[h] Designation | Mole %[a] Hexene | Mw[b] | Mw/Mn[b] | Density[b] | CDBI[b] |
|---|---|---|---|---|---|
| C27 | 6.1 | 12,500 | 1.9 | — | 77% |
| C30 | 2.0 | 48,800 | 1.9 | — | 81 |
| C42 | 0.0 | 259,000 | 2.0 | — | 100 |
| Blend 8A[c] | 2.7 | 113,000 | 9.0 | 0.933 | 24 |
| C15 | 0.0 | 13,400 | 2.7 | — | 100 |
| C30 | 2.0 | 48,000 | 1.9 | — | 81 |
| C64 | 4.2 | 223,000 | 2.2 | — | — |
| Blend 9D[d] | 2.1 | 95,600 | 9.8 | 0.940 | 42 |
| C19 | 2.3 | 13,600 | 1.9 | — | 70 |
| C30 | 2.0 | 48,800 | 1.9 | — | 81 |
| C38 | 2.2 | 240,000 | 2.2 | — | — |
| Blend 20C[e] | 2.3 | 94,800 | 8.8 | 0.932 | 64 |
| C15 | 0.0 | 13,400 | 2.7 | — | 100 |
| C09 | 3.0 | 52,000 | 2.4 | — | 79 |
| C03 | 3.1 | 121,000 | 2.2 | — | 67 |
| Blend 21F[f] | — | 62,000 | 6.4 | 0.946 | 46 |
| C15 | 0.0 | 13,400 | 2.7 | — | 100 |
| C09 | 3.0 | 52,000 | 2.4 | — | 79 |
| C48 | 7.2 | 50,000 | 1.9 | — | 75 |

TABLE 4-continued

POLYMER CHARACTERIZATION
OF BLENDS AND BLEND COMPONENTS

| Sample[h] Designation | Mole %[a] Hexene | Mw[b] | Mw/ Mn[b] | Density[b] | CDBI[b] |
|---|---|---|---|---|---|
| Blend 22E[g] | — | 37,800 | 4.2 | 0.940 | 37 |

[a] Calculated from absorbance of 1378 cm$^{-1}$ IR band using spectral substraction to correct for overlap of adjacent IR bands. Residual peak at 1378 cm$^{-1}$ was converted to hexane content using calibration obtained by C13 NMR analysis of poly(ethylene-co-hexenes).
[b] Same as in Table 1
[c] Blend 8A consisted of equal quantities of C27, C30 and C42
[d] Blend 9D consisted of equal quantities of C15, C30 and C64
[e] Blend 20C consisted of equal quantities of C19, C30 and C38
[f] Blend 21F consisted of equal quantities of C15, C09 and C03
[g] Blend 22E consisted of equal quantities of C15, C09 and C48
[h] Blend components in this table are identified by the letter C followed by the corresponding polymerization run number from Table 3. For example, blend component C27 was obtained from polymerization run 27.

TABLE 5

PROPERTIES OF MOLDED SHEET

| Sample | Tear Strength g/mil | Tensile Strength at Yield, psi | Hexane Extractable Polymer % |
|---|---|---|---|
| Blend 8A | 68 | 1770 | 22 |
| Blend 9D | 241 | 1980 | 3.0 |
| Blend 20C | 426 | 1400 | 6.3 |
| Blend 21F | 205 | 2050 | 4.5 |
| Blend 22E | 107 | 2050 | 6.7 |

[a] Tear strength measured by ASTM 1922, tear resistance by pendulum method.
[b] Tensile strength at yield measured using ASTM D638.
[c] Extractables were determined as follows. About 0.5 g of polymer molded sheet, ca. 5 mil thick, was weighed and placed in a weighed cellulose extraction thimble. The thimble and polymer were placed in a vapor jacketed Soxlet-type extractor, and the polymer was extracted with condensed vapors of boiling hexane at 69° C. for 16 hours. The thimble and residual polymer were removed, dried in a vacuum oven, and weighed to determine the amount of extracted, i.e., soluble, polymer.

The foregoing description of the invention is illustrative and explanatory thereof. Various changes in the materials, apparatus, and particular steps employed will occur to those skilled in the art. It is intended that all such variations within the scope and spirit of the appended claims be embraced thereby.

We claim:

1. A polymer blend composition comprising: a plurality of linear ethylene interpolymer components comprising ethylene and at least one alpha-olefin comonomer, each component having a different average molecular weight, a Mw/Mn≦3, a composition distribution breadth index of at least 50% and a density greater than or equal to 0.900 g/cm$^3$; the composition having a density greater than or equal to 0.900 g/cm$^3$ and a Mw/Mn>3; wherein the composition is essentially free of components having a higher average molecular weight and a lower average comonomer content than that of any other components.

2. The composition of claim 1, wherein said composition has a density in the range of 0.900 to 0.94 g/cm$^3$.

3. The composition of claim 1, wherein said components have an α-olefin comonomer content in the range of 1 to 30 mole percent and an ethylene content in the range of 99 to 70 mole percent.

4. The composition of claim 1, wherein said components are selected from the group consisting of: very low density linear polyethylenes; and linear, low density polyethylenes.

5. The blend of claim 1, wherein the blend components have essentially the same comonomer content and different molecular weights.

6. The composition of claim 1, wherein the molecular weights and the comonomer contents of the components are both different.

7. The composition of claim 1, wherein the value of M/M$_n$ for each component is less than or equal to 2.5.

8. The composition of claim 1, wherein the composition distribution breadth index for each component is greater than about 70%.

9. A polymer blend comprising:
a plurality of linear ethylene interpolymer components comprising ethylene and at least one alpha-olefin comonomer, each component having a different average molecular weight, a narrow molecular weight distribution such that Mw/Mn≦3, a composition distribution breadth index of at least 50% and a density greater than or equal to 0.900 g/cm$^3$; and
said components are selected from one of the groups consisting of: (1) components having essentially the same average comonomer content but different average molecular weights; and (2) components having different average molecular weights and comonomer contents; and wherein said blend has a density greater than or equal to 0.900 g/cm$^3$ and a Mw/Mn≦3 wherein the blend is essentially free of blend components having both a higher average molecular weight and a lower average comonomer content than that of any other component and said blend has a density greater than or equal to 0.900 g/cm$^3$.

10. The blend of claim 9, wherein the blend has a density of 0.900 to 0.94 g/cm$^3$.

11. The blend of claim 9, wherein said components each have an average molar α-olefin comonomer content of 1–30 percent.

12. The blend of claim 11, wherein said components include very low density, linear polyethylenes.

13. The blend of claim 11, wherein said components include linear, low density polyethylenes.

14. The blend of claim 9, wherein the number of said components is from 2 to 5.

15. The blend of claim 9, wherein the blend has plural modality with respect to molecular weight, comonomer content or both.

16. The blend of claim 11, wherein said α-olefins have from 3 to about 12 carbon atoms.

17. The blend of claim 9 wherein each of said components have a Mw/Mn<2.5 and a composition distribution breadth index in the range from 50 to 70%.

18. The blend of claim 17, wherein M$_w$/M$_n$≦2.0 for each component.

19. The blend of claim 17, wherein each component has a composition distribution breadth index in the range of from 50 to 90%.

20. A polymer blend composition comprising:
a plurality of ethylene interpolymers comprising ethylene and at least one α-olefin comonomer, each of said components having a different average molecular weight, a Mw/Mn≦3, a CDBI of at least 50% and a density greater than or equal to 0.900 g/cm$^3$; the composition having a density in the range of greater than or equal to 0.900 g/cm$^3$ to 0.940 g/cm$^3$ and a Mw/Mn≦3; wherein the composition is essentially free of blend components having both a higher average molecular weight and a lower average comonomer content than that of any other component.

21. The composition of claim 20 wherein said components have an α-olefin comonomer content in the range of 1 to 30 mole percent and an ethylene content in the range of 99 to 70 mole percent.

22. The composition of claim 20 wherein said components have essentially the same comonomer content and different molecular weights.

23. The composition of claim 20 wherein said components have both a different molecular weight and comonomer content.

24. The composition of claim 20 wherein each of said components have a Mw/Mn less than or equal to 2.5.

25. The composition of claim 20 wherein each of said components have a CDBI greater than about 60%.

26. The composition of claim 20 wherein each of said components have a CDBI greater than 70%.

27. The composition of claim 20 wherein at least one of said components has a CDBI greater than 70%.

28. The composition of claim 20 wherein said components consist of at least one of the group of very low density linear polyethylenes and linear low density polyethylenes.

29. The composition of claim 20 wherein said components have a Mw/Mn≦2.5 and a CDBI greater than 70%.

30. A polymer blend composition comprising:
a plurality of ethylene interpolymer components comprising ethylene and at least one α-olefin comonomer, each of said components having a different average molecular weight, a Mw/Mn≦3, a CDBI greater than 50% and a density greater than or equal to 0.900 g/cm³; said composition having a density in the range of about 0.900 g/cm³ to about 0.940 g/cm³, a Mw/Mn>3 and a CDBI greater than 50%; wherein the composition is essentially free of said components having both a higher average molecular weight and a lower average comonomer content than that of any other component.

31. The composition of claim 30 wherein said components have an α-olefin comonomer content in the range of 1 to 30 mole percent and an ethylene content in the range of 99 to 70 mole percent.

32. The composition of claim 30 wherein said components have essentially the same comonomer content and different molecular weights.

33. The composition of claim 30 wherein said components have both a different molecular weight and comonomer content.

34. The composition of claim 30 wherein each of said components have a Mw/Mn less than or equal to 2.5.

35. The composition of claim 30 wherein each of said components have a CDBI greater than about 60%.

36. The composition of claim 30 wherein each of said components have a CDBI greater than 70%.

37. A polymer blend composition comprising:
a plurality of linear ethylene interpolymer components comprising ethylene and at least one $C_3$-$C_{12}$ α-olefin comonomer, each of said interpolymers having a different average molecular weight, a Mw/Mn≦3 and a CDBI greater than 50% and a density greater than or equal to 0.900 g/cm³; a high density polyethylene component; said composition having a density greater than or equal to 0.900 g/cm³, and a Mw/Mn≦3; wherein the composition is essentially free of said components having both a higher average molecular weight and a lower average comonomer content than that of any other component.

38. The composition of claim 37 wherein said interpolymer components have a CDBI of at least 60%.

39. The composition of claim 37 wherein at least one of said interpolymer components has a CDBI of at least 70%.

40. The composition of claim 37 wherein the composition has a density in the range of 0.900 g/cm³ to about 0.940 g/cm³.

* * * * *